July 15, 1947.    A. B. SCHULTZ    2,423,906
WINCH CONSTRUCTION
Filed Feb. 26, 1944    2 Sheets-Sheet 1
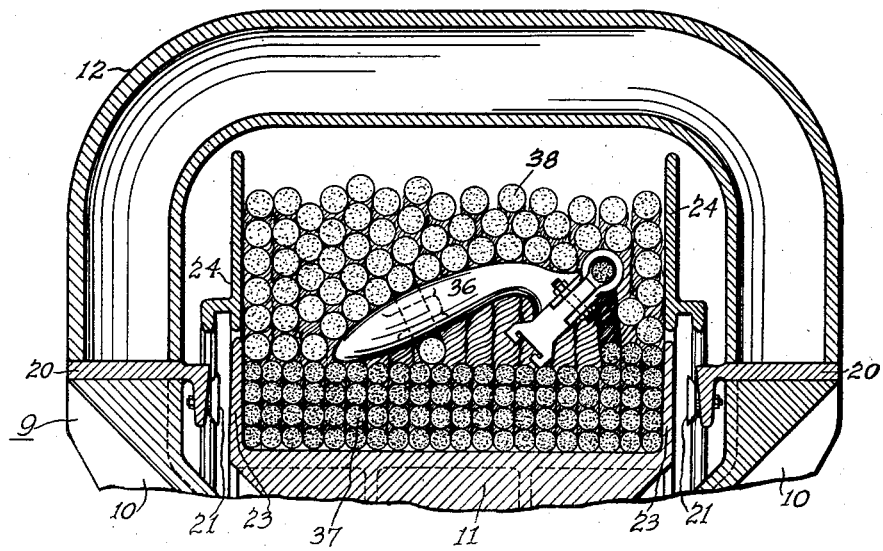
Fig:2
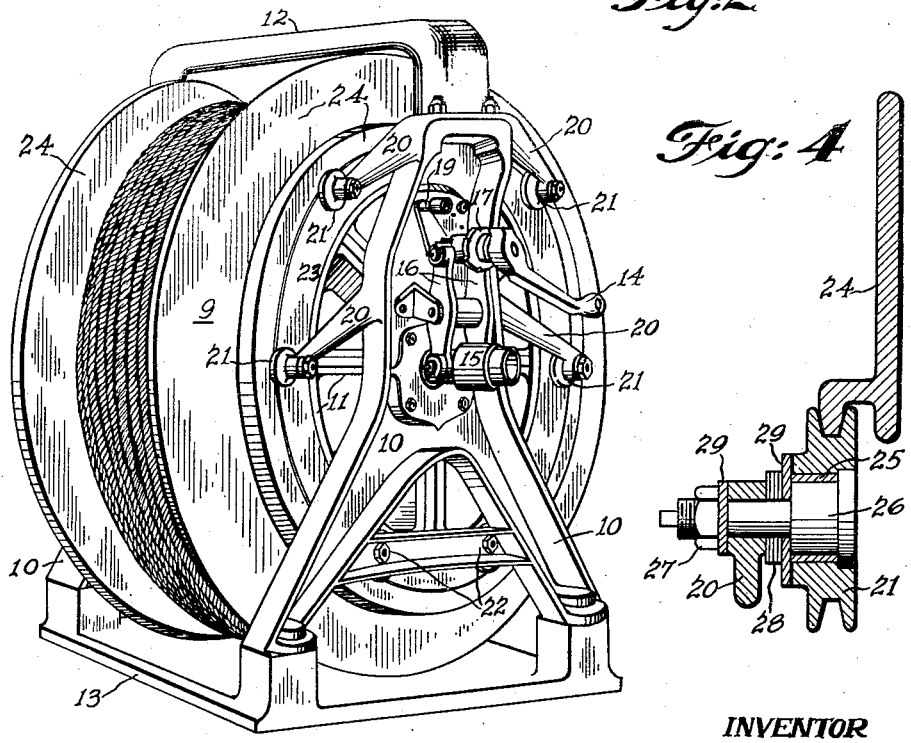
Fig:1
Fig:4
INVENTOR
ARTHUR B. SCHULTZ
BY
Hyde W. Ballard
ATTORNEY July 15, 1947. A. B. SCHULTZ 2,423,906
WINCH CONSTRUCTION
Filed Feb. 26, 1944 2 Sheets-Sheet 2
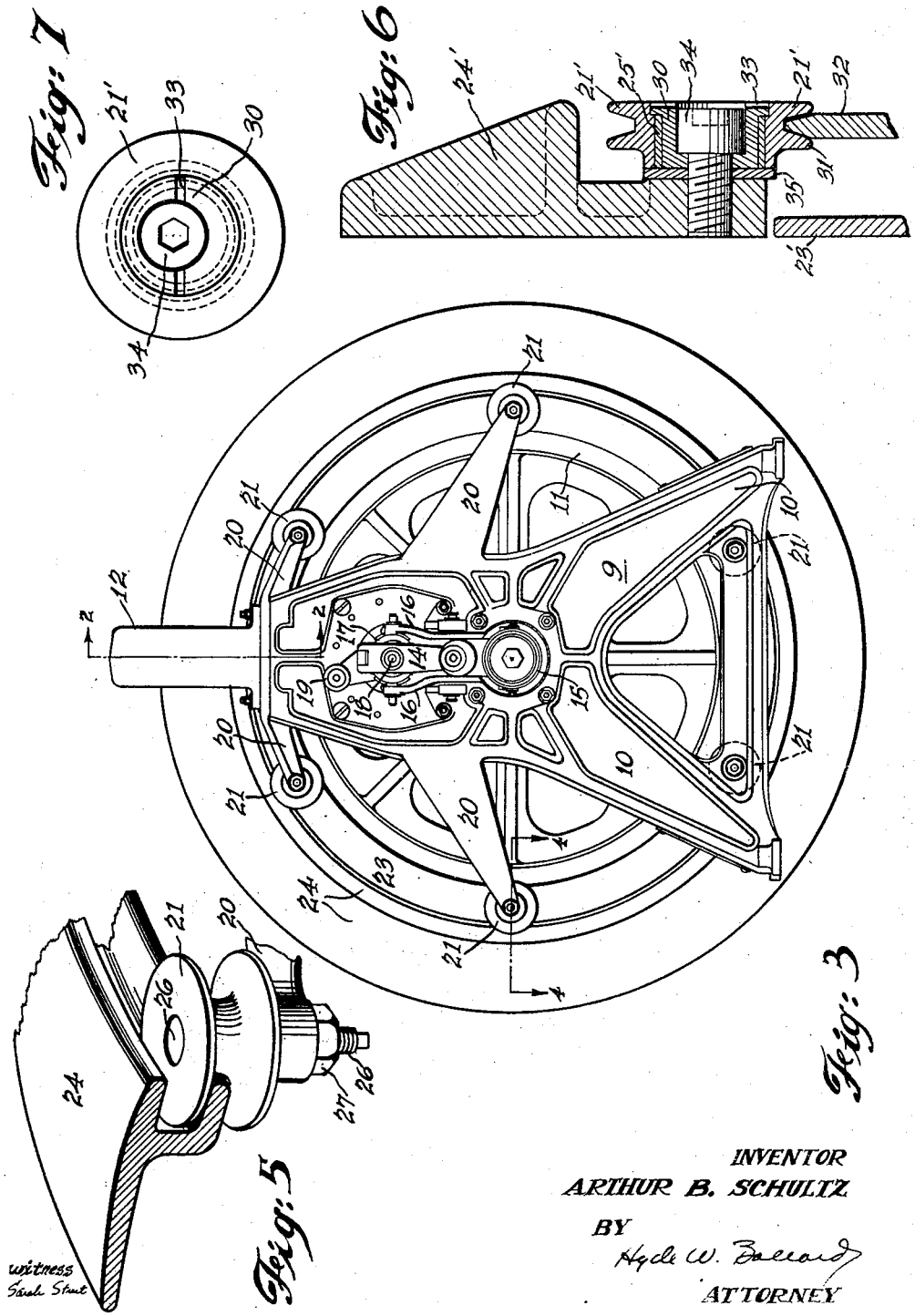
INVENTOR
ARTHUR B. SCHULTZ
BY
Hyde W. Ballard
ATTORNEY Patented July 15, 1947

2,423,906

UNITED STATES PATENT OFFICE 2,423,906

WINCH CONSTRUCTION

Arthur B. Schultz, Wilmington, Del., assignor to
All American Aviation, Inc., Wilmington, Del.,
a corporation of Delaware Application February 26, 1944, Serial No. 524,027

4 Claims. (Cl. 254—150)

My invention relates to winches and more particularly to drums upon which a length of line or cable is wound.

Winches which have heretofore been commonly used as shock absorbing devices in air pick-up systems for aircraft and cargoes, such as that described more particularly in Plummer application Serial No. 423,999, now Patent No. 2,373,414, dated April 10, 1945, and Schultz application Serial No. 472,600, filed January 16, 1946, are designed to have a length of pick-up line wound thereon and when contact is made with the object which is to be accelerated suddenly, the line reels off of the drum or winch. At the same time, automatic braking devices are set in motion for retarding the pay out operation.

A factor in the design of winch drums of this type has been the difficulty in overcoming the inertia of the drum since the peripheral speed of the drum must attain the speed of the aircraft within a fraction of a second or thereabouts. Obviously, the inertia of the drum and the line wound thereon imposes considerable resistance to the sudden turning of the drum, which resistance results in serious shock to the various parts of the equipment. Since the moment of inertia of a rotating object varies with the fourth power of its diameter, it is extremely desirable to keep the diameter of drums adapted for pick-up purposes as small as possible. The weight and dimensions of a suitable flange for retaining the necessary amount of line upon such a drum have been found to materially increase the inertia of the drum, and, therefore, the energy which must be dissipated in accelerating the drum to the speed of the aircraft becomes excessive.

An object of my invention, therefore, is to provide a drum having a minimum of inertia and a maximum of line holding capacity.

A further object of my invention is to provide an independent flange which cooperates with the flange of a cable bearing drum.

Another object of my invention is to provide a line retaining flange for a drum which rotates with the drum only when sufficient line is wound upon the drum.

Further objects will be apparent from the specification and drawings, in which:

Fig. 1 is a perspective view of a winch incorporating one form of my invention,

Fig. 2 is a detail section showing the outer periphery of the drum and the cooperating flange taken along lines 2—2 of Fig. 3.

Fig. 3 is a side elevation of the structure shown in Fig. 1,

Fig. 4 is a detail sectional view of a rotating flange and support,

Fig. 5 is a detailed fragmentary perspective view of the structure shown in Fig. 4, Fig. 6 shows a modified form of rotating flange supporting structure, and Fig. 7 is a side elevation of a modified form of flange supporting roller.

Like reference characters denote like parts in the several figures of the drawings.

While certain novel features of the invention are disclosed herein with considerable detail with respect to certain particular forms of the invention, it is not desired to be limited to such details since many changes and modifications may well be made without departure from the spirit of the invention in its broadest aspect.

Referring now more particularly to the drawings, Fig. 1 shows one form of air pick-up shock absorbing winch, designated generally by the reference numeral 9, having drum supporting members 10 journaling a drum 11 and secured at one extremity by tie bar 12 and mounted on any convenient base 13 at the other extremity. Winch 9 has a brake resetting handle 14, main brake adjustment 15, operating yoke 16, cam 17, countershaft 18 (Fig. 3) and time delay adjustment 19.

For a more detailed description of the operation of the braking mechanism, reference is made to my application Serial No. 472,600, which insofar as may be necessary to complete the disclosure, is incorporated herewith.

The operation and structure of the winch braking mechanism forms no part of my present invention.

Frame members 10 have extending therefrom arms 20 which support grooved rollers 21. Other rollers 21 may be conveniently journaled in the frame member 10 as at 22 (Fig. 1).

Referring now to Fig. 2, drum 11 carries integrally therewith flanges 23 for properly positioning the line or cable around the drum and preventing it from spilling off therefrom. Rotating annular flanges 24, generally in line with flanges 23, are rotatably mounted in rollers 21. It will be apparent that the mounting of the rotatable flanges 24 will be substantially identical on either side of the drum, and it is believed, therefore, unnecessary to illustrate both sides of the winch.

It will be apparent that rotating flanges 24 are free to rotate independently of each other and the drum, rotation being imparted to them merely by friction of the line when a sufficient length thereof becomes wound upon the drum 11 to exceed the depth of the integral flanges 23. A desirable form of roller mounting, which may be used for all of the rollers 21, is shown in Fig. 4. In order to reduce friction to a minimum, each roller 21 may be mounted on a suitable anti-friction bushing 25 adapted to turn on pin 26, Fig. 4. Pin 26 may be conveniently secured to the arm 20 by nut 27, spacers 28, and washers 29.

A modified form of roller mount is shown in Fig. 6 in which the roller and its bearings are mounted on the rotating flange 24'. In addition, the roller 21' and bushing 25' may be mounted on an eccentric bushing 30 in order to facilitate assembly of the winch. It will be apparent that the eccentricity of bushing 30 should be sufficient to permit lip 31 to clear outer edge of guide 32. Eccentric bushing 30 has a slot 33 or other convenient means for rotating it with respect to bolt 34. After the flange 24' is inserted in place, eccentric bushing is rotated to permit the groove of roller 21' to cooperate with guide 32, which may be conveniently mounted on the frame. Socket head bolt 34 is then tightened against bushing 30 and washer 35.

Although rollers have been illustrated, it will be understood that any suitable bearing or bearings may be used for mounting the rotatable flange without departing from the spirit of the invention.

Fig. 2 shows the winch and line as it would appear preparatory to setting the equipment for a pick-up. As is well known to those skilled in the pick-up art, a pick-up hook 36 is secured to a line or cable, designated generally by 37, which is wound on the drum at the time of pick-up operation. A loop and leader, designated generally by 38, are supported on the ground and attached to the object to be picked up (not shown). At the time of pick-up, the hook 36 engages the loop causing cable 37 to pay out from the drum. Depending upon the nature of the operation, the drum is then turned in the opposite direction by a suitable motor or crank (not shown) to reel in the line 37, hook 36, loop and leader 38. This reeling in is continued until the object is completely withdrawn inside the airplane or until the glider or other aircraft (not shown) is towed at the normal distance. Obviously, it is essential that the line carrying capacity of the drum be ample to accommodate both the line and the normally ground supported loop and leader.

In operation, only the line 37 will be carried on the drum and the capacity of the integral flanges will be sufficient for only the required length of line carried by the drum at the time of pick-up. It will be apparent that in this position, the rotatable flanges 24 and 24' will not carry any line or cable between them. Therefore, when the drum pays out, the rotatable flanges remain stationary. After the pay out has stopped, the line will be reeled in past the original point of pay out and gradually build up between the rotatable flanges. As this occurs, the flanges 24 and 24' will be free to rotate with the drum due to the friction of the loop and leader thereon, until the line, hook, loop and leader are sufficiently wound upon the drum, as shown in Fig. 2.

It will be apparent that the relative dimensions of the integral flanges 23 and rotating flanges 24, 24' will depend upon individual conditions.

Having thus described my invention, I claim:

1. In a winch, a rotatable drum including a cylindrical portion and spaced inner end flanges integral with said cylindrical portion, and a pair of outer flanges encircling said inner end flanges being substantially in alignment therewith and rotatable independently of said inner flanges, the space between said outer flanges being free of any structure whereby said outer flanges cooperate with the inner end flanges and the cylindrical portion of said drum to define a cable receiving space.

2. In a winch, a supporting frame, a drum journaled for rotation in said frame, said drum comprising a cylindrical portion and spaced end flanges, a pair of outer flanges spaced apart corresponding to the spacing of said end flanges and encircling said end flanges, and means for rotatably supporting said outer flanges from said frame independently of said drum.

3. In a winch, a supporting frame, a drum journaled in said frame for rotation, said drum including spaced end flanges, outer flanges encircling said end flanges and correspondingly spaced apart, means for rotatably supporting said outer flanges in said frame independently of said drum, said outer and end flanges cooperating to define a cable receiving space, and a line wound on said drum in said space.

4. In a winch assembly, a frame, a drum journaled therein, a circular track attached to said frame adjacent each side of said drum, annular radially extending flanges in spaced relation encircling the periphery of said drum, rollers journaled on said annular flanges and adapted to run on said tracks, and a line for winding on said drum and between said annular flanges.

ARTHUR B. SCHULTZ.

REFERENCES CITED

The following references are of record in the file of this patent:

UNITED STATES PATENTS

| Number | Name | Date |
| --- | --- | --- |
| 2,103,541 | Low | Dec. 28, 1937 |
| 1,527,478 | Harper | Feb. 24, 1925 |
| 456,763 | Gibbins | July 28, 1891 |
| 1,805,800 | Berger | May 19, 1931 |

FOREIGN PATENTS

| Number | Country | Date |
| --- | --- | --- |
| 382,539 | Germany | Oct. 4, 1923 |